Feb. 7, 1967 S. A. WINGATE 3,303,347

PLURAL TRACK SHAFT ANGLE ENCODING SYSTEM USING EXCLUSIVE OR LOGIC

Filed Oct. 30, 1963 3 Sheets-Sheet 1

INVENTOR.
Sidney A. Wingate
BY
Morse & Altman
ATTORNEYS

Feb. 7, 1967 S. A. WINGATE 3,303,347

PLURAL TRACK SHAFT ANGLE ENCODING SYSTEM USING EXCLUSIVE OR LOGIC

Filed Oct. 30, 1963 3 Sheets-Sheet 2

INVENTOR.
Sidney A. Wingate
BY Morse & Altman
ATTORNEYS

Feb. 7, 1967 S. A. WINGATE 3,303,347

PLURAL TRACK SHAFT ANGLE ENCODING SYSTEM USING EXCLUSIVE OR LOGIC

Filed Oct. 30, 1963 3 Sheets-Sheet 3

INVENTOR.
Sidney A. Wingate
BY Morse & Altman
ATTORNEYS

United States Patent Office 3,303,347
Patented Feb. 7, 1967

3,303,347
PLURAL TRACK SHAFT ANGLE ENCODING SYSTEM USING EXCLUSIVE OR LOGIC

Sidney A. Wingate, Concord, Mass., assignor to Wayne-George Corporation, Newton, Mass., a corporation of Massachusetts Filed Oct. 30, 1963, Ser. No. 320,215
12 Claims. (Cl. 250—220)

The present invention relates to shaft angle encoding by which digital information is generated as a function of angular position and, more particularly, to the determination of extremely precise information in regard to shaft angularity by a so-called direct reading encoder. In a typical direct reading encoder, angular position is determined in conjunction with a coded component (e.g. a disk) that is provided about its periphery with a series of concentric tracks, each having alternate increments (e.g. opaque and clear), which alternately actuate (e.g. direct radiation toward and obscure radiation from) a bank of suitable sensing components (e.g. photoelectric transducers). Encoding, in effect, involves direct reading logic circuitry for a selected grouping of coded increments that extends from track to track. When the concentric tracks are in natural binary code, i.e. when the increments of these tracks represent binary digits, it is inherent that whenever a change in a more significant digit occurs, it is accompanied by a change in a less significant digit. As a practical matter, theoretically exact simultaneity of such changes is impossible to achieve from an engineering standpoint. However, when several digital indications are designed to change at any given time in logic circuitry, accurate operation of this circuitry requires that they do change at that time or that some compensatory or carry-over logic circuitry be provided to obviate any unintended change. Since it is impossible to provide code tracks of the foregoing type in which exact coincidence of leading and lagging edges exists, appropriate carry-over logic circuitry is required. The present invention contemplates such an encoder capable of producing digital indications of unusual precision with direct reading and carry-over logic circuitry having unusually few components per number of digits.

In a typical prior direct reading, natural binary encoder, an outer code track representing a less significant digit and an inner code track representing a more significant digit are detected by an outer sensing arrangement and an inner sensing arrangement. The outer code track has twice as many opaque increment, clear increment cycles as the inner code track. It will be understood that specified (increment) edges of each cycle of the outer track theoretically must coincide with corresponding specified (increment) edges of the inner track. In order to guarantee that such coincidence will occur electronically, the following logical principles and consequent electronics typically have been applied. Assuming that opaque increments of both tracks are designated ZEROs and that clear increments of both tracks are designated ONEs (or vice versa):

(1) If the less significant digit of the outer track equals ZERO, the more significant digit of the inner track is the same as it will be for the next higher number; and (2) If the less significant digit of the outer track equals ONE, the more significant digit of the inner track is the same as it was for the previous lower number.

In the consequent interconnecting logic electronics, the outer sensing arrangement ensures that any transition occurring at the inner sensing arrangement will lead or lag the transition that would theoretically occur at the inner sensing arrangement, if the interconnecting logic electronics were not provided. In practice, the inner sensing arrangement includes two photocells which are spaced from each other in such a way that when a transition in the outer track occurs at the outer sensing arrangement, one photocell of the inner track lags and the other photocell of the inner track leads the theoretical corresponding transition in the inner track. If the outer sensing arrangement indicates a ONE, the lagging photocell of the inner sensing arrangement is rendered operative and the leading photocell inoperative. If the outer sensing arrangement indicates a ZERO, the leading photocell of the inner sensing arrangement is rendered operative and the lagging photocell inoperative. This type of switching, however, is such that: undesired transients may be generated in the photocells being switched so as to reduce their signal-to-noise ratios; and undesired complexity of the electro-optical system is required for generation of any given number of digits.

It has been found that angular displacement of an encoding disk of the foregoing type may be designed to cause a photocell associated with one of its tracks to produce an output signal that is periodic, e.g. at least roughly trapezoidal or sinusoidal. The primary object of the present invention is to utilize a sensing arrangement of at least two photocells of the foregoing type at different angular positions with respect to one code track in order to produce an association of at least two wave forms that are displaced in phase from each other: (1) to indicate digital information in the form of at least two digits of lesser significance; and (2) to provide carry-over logic for the control of digital information of greater significance. In a preferred embodiment of the present invention, switching of photocells does not occur and two digits per code track are generated. In another preferred embodiment, each code track includes two sub-tracks and each photocell unit includes two photocells in push-pull relation.

Other objects of the present invention will in part be obvious and will in part appear hereinafter.

The present application is a continuation-in-part of U.S. patent application Serial No. 279,071, filed on May 9, 1963, in the name of Sidney A. Wingate for Shaft Angle Encoding, all of the disclosure of which is incorporated herein by reference.

For a full understanding of the nature and objects of the present invention, reference should be had to the following detailed description, taken in connection with the accompanying drawing, wherein.

Figure 3:
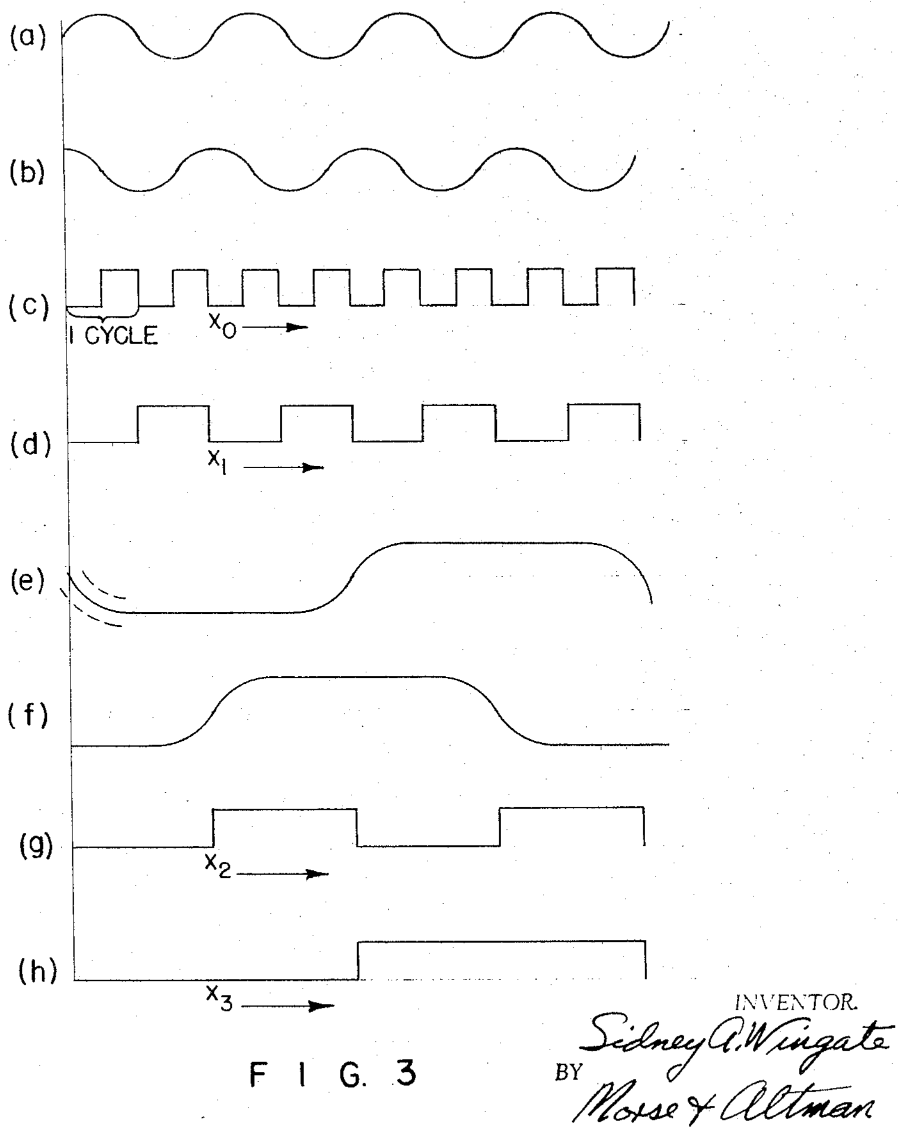

FIG. 3 graphically illustrates certain principles of the present invention.

Figure 4:
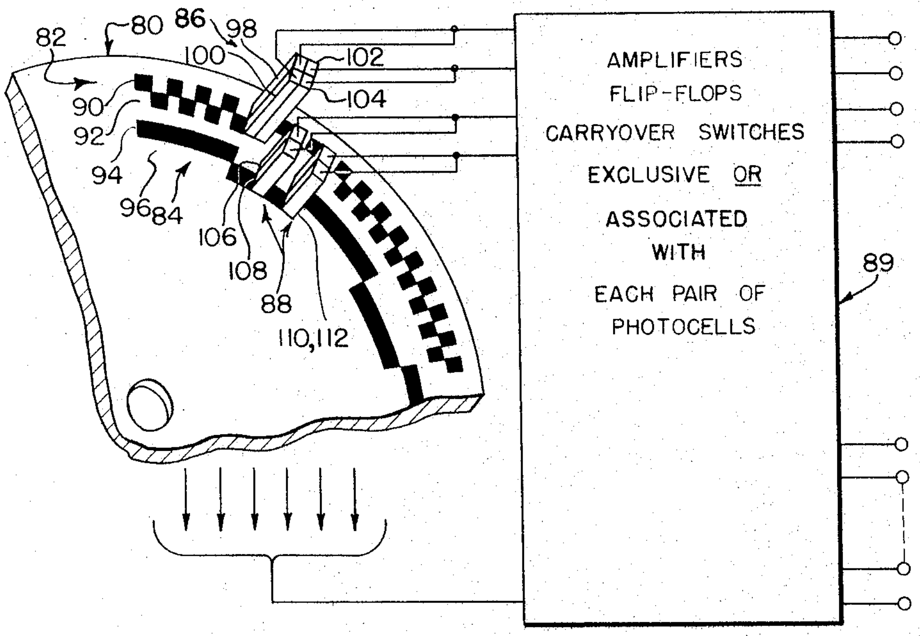
Figure 5:
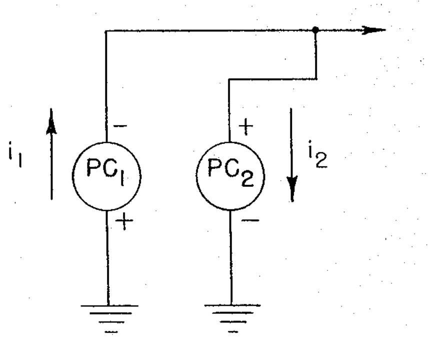

FIG. 4 is a diagrammatic view, partly in mechanical perspective and partly in electrical schematic, of another shaft angle encoding system embodying the present invention;

FIG. 5 illustrates electrical details of the system of FIG. 4; and

Figure 6:
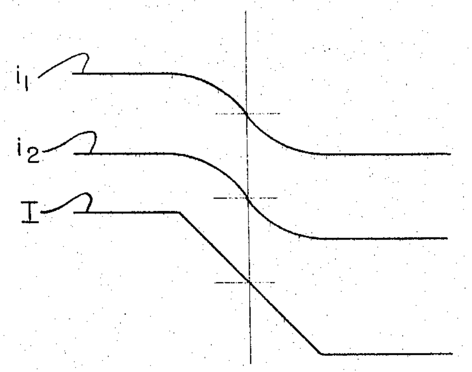

FIG. 6 graphically illustrates certain principles of the system of FIG. 4.

Figure 1:
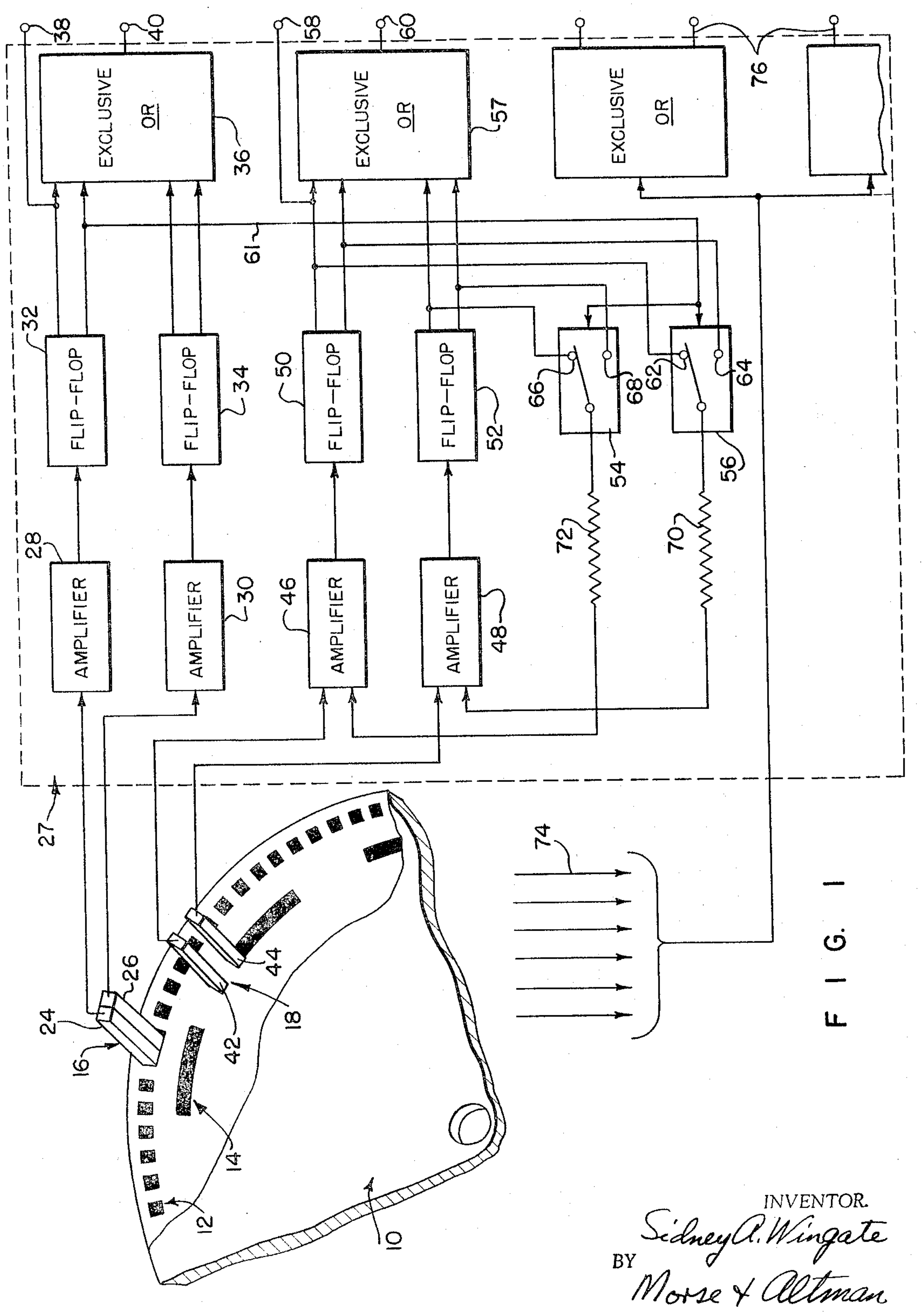
FIG. 1 is a diagrammatic view, partly in mechanical perspective and partly in electrical schematic, of a shaft angle encoding system embodying the present invention.
Figure 2:
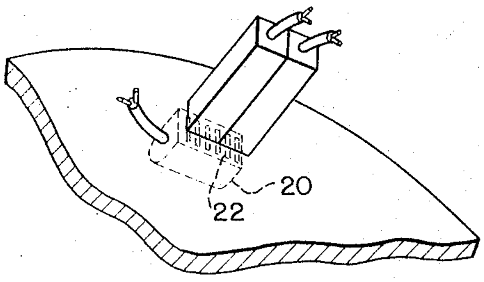
FIG. 2 is a perspective view of certain details of the system of FIG. 1.

The embodiment of the present invention illustrated in FIGS. 1 to 3 comprises, as an encoder or the like, a disk 10 presenting a plurality of concentric code tracks, two of which are shown at 12 and 14, particular arrangements of photocells 16 and 18 in registration with the code tracks, and suitable sources 20 (FIG. 2) of illumination for the code tracks. The photocells are associated with output circuitry 27 to be described in detail below. Ordinarily, the disk is composed of glass and the tracks are provided by silver halide photography in terms of silvered and clear regions of a gelatine stratum. Details of such an encoder are described, for example, in U.S. patent application Serial No. 168,473, filed January 25, 1962, now Patent No. 3,187,187, in the name of Sidney A. Wingate for Shaft Encoder. As shown in FIG. 2, a pair of photocells, corresponding to photocells 16 or 18, are spaced along their associated track from each other by 90° in terms of a single opaque increment, clear increment cycle. Each of these photocells receives illumination through a series of slits 22, which present a sequence of blocking and transmitting increments of substantially the same dimensions as the opaque and clear increments of the code track for the purpose of transmitting optimum light flux while maintaining maximum optical resolution. Each pair of photocells produce a pair of angular position signals, generally sinusoidal or trapezoidal in wave form, that are ¼ cycle out-of-phase. For purposes to be explained below, in the illustrated embodiment, the photocell arrangement of each of the tracks is similar to that of the first track. The photocell arrangement associated with any single code track applies its outputs essentially in a manner that provides, in combination with outputs of the remaining photocells from other code tracks, a composite representation of angular position of disk 10.

The channel for outer or least-significant code track 12 includes a pair of photocells 16, individually designated 24, 26, a pair of amplifiers 28, 30 respectively associated with photocells 24, 26, a pair of flip-flops 32, 34 respectively associated with amplifiers 28, 30 and an output circuit 36. Pair of photocells 24, 26 produce a pair of generally ¼ cycle out-of-phase wave forms that are shown at *a* and *b* in FIG. 3. These wave forms are applied by pair of amplifiers 28, 30 to pair of flip-flops 32, 34, which together provide analog indications of the four quadrants of any clear increment, opaque increment cycle in outer track 12. These analog indications designate two binary numbers $X_0$ and $X_1$, $X_0$ being the least significant digit and $X_1$ being the second-least significant digit. Since one cycle of wave form *a* directly corresponds to one cycle of track 12, the value of one of these binary numbers, namely $X_1$ as suggested at *d* in FIG. 3, is directly indicated as at 38 in FIG. 1 by the state of flip-flop 32. On the other hand, the value of the other of these binary numbers, namely $X_0$ as suggested at *c* in FIG. 3, is indicated as at 40 in FIG. 1 by a logical combination of the outputs of flip-flops 32 and 34. In other words, the ONE and ZERO states of flip-flop 32 and the ONE and ZERO states of flip-flop 34 may be combined to produce four different numbers. In the course of a single cycle of outer code track 12, $X_1X_0$ assumes the following sequence of values: 00; 01; 10; 11. In conventional logic notation, if A and $\bar{A}$ represent the two complementary outputs of flip-flop 32 and B and $\bar{B}$ represent the two complementary outputs of flip-flop 34, then $X_1=A$ and $X_0=A\bar{B}+\bar{A}B$, the latter expression being Exclusive-OR in form. In conventional fashion, the foregoing Exclusive-OR expression means that only one of two possible outputs can occur but not both of the two possible outputs, at any given time.

The channel for the next-outermost track 14 includes pair of photocells 18; individually designated 42, 44, a pair of amplifiers 46, 48 respectively associated with photocells 42, 44, a pair of flip-flops 50, 52 respectively associated with amplifiers 46, 48, a pair of carry-over switches 54, 56 and an output circuit 57. Pair of photocells 42, 44 produces a pair of generally trapezoidal, ¼ cycle out-of-phase wave forms that are shown at *e* and *f* in FIG. 3. These wave forms are applied by pair of amplifiers 46, 48 to a pair of flip-flops 50, 52, which together provide analog indications of the four quadrants of any clear increment, opaque increment cycle in track 14. These analog indications designate two binary numbers $X_2$ and $X_3$, $X_2$ being the third-least significant digit and $X_3$ being the fourth-least significant digit. Since one cycle of either of wave forms *e* and *f* directly corresponds to one cycle of track 12, the value of one of these binary numbers, namely $X_3$ as suggested at *h* in FIG. 3, is directly indicated as at 58 in FIG. 1 by the state of flip-flop 50. On the other hand, the value of the other of these binary numbers, namely $X_2$ as suggested at *g* in FIG. 3, is indicated as at 60 in FIG. 1 by a logical combination of the outputs of flip-flops 50 and 52. In other words, the ONE and ZERO states of flip-flop 50 and the ONE and ZERO states of flip-flop 52 may be combined in logic circuit 57, an Exclusive-OR circuit, to produce four different numbers which represent values of $X_2$ in the manner described above in connection with values of $X_0$.

The carry-over logic circuitry including switches 54 and 56 operates to guarantee that transitions in the wave forms from track 14 occur simultaneously with corresponding transitions in the wave forms from track 12. Electronically, this guarantee is effected by adding or subtracting small signal increments, as suggested in dotted lines at *e* in FIG. 3, to the signals associated with inner track 14 at the command of the signal output associated with outer track 12. Specifically, with respect to theoretically aligned edges of increments of the outer and inner tracks, an indication of a transition of the outer track is combined with an indication of an increment of the inner track to ensure that no indicated change in the inner track can occur in the absence of an indicated change in the outer track. The indication of the outer track is applied to switches 54 and 56 as at 61. It will be observed that the square wave outputs of flip-flop 50 are fed to input terminals 62, 64 of switch 56 and that the square wave outputs of flip-flop 52 are fed to input terminals 66, 68 of switch 54. The output of switch 56 is fed through a resistor 70 to amplifier 48 and the output of switch 54 is fed through a resistor 72 to amplifier 46. Thus, for example, when the specified output of the outer track is such that $X_1$ is ONE, a small fraction of the output of flip-flop 50 is combined with the input of amplifier 48 to develop a slightly lagging composite output, and a small fraction of the output of flip-flop 52 is combined with the input of amplifier 46 to develop slightly lagging composite output. The transitions of these composite outputs are guaranteed not to occur before the corresponding transitions of the first track. And, for example, when the specified output of the outer track is such that $X_1$ is ZERO, a small fraction of the output of flip-flop 50 is combined with the input of amplifier 48 to develop a slightly leading composite output, and a small fraction of the output of flip-flop 52 is combined with the input of amplifier 46 to develop a slightly leading composite output. The transitions of these composite outputs are guaranteed not to occur after the corresponding transitions of the first track. The net result is that the electronic indication of the transition in the inner track is guaranteed to occur simultaneously with the electronic indication of the transition in the outer track.

The remaining code tracks of the illustrated system are six in number, being associated with suitable channels 74 and outputs 76. Each of these tracks is associated with two photocells which, in the above discussed manner, indicate two digits and provide carry-over logic for the next-inner track. The number of increments of any track is four times the number of increments of the next-inner track. In operation, any angular position of disk 10 is translated by the sequence of pairs of photocells associated with the sequence of tracks into pairs of digits via the sequence of channels. In each channel, a pair of signals from a pair of photocells is amplified, a pair of flip-flops is controlled, and the resulting signals represent two numbers, the value of one of which is indicated directly and the value of the other of which is indicated by an Exclusive-OR circuit. Carry over signals inherently exist and are applied from track to track.

The embodiment of the present invention illustrated in FIGS. 4 to 6 comprises a disk 80 presenting a plurality of concentric tracks, two of which are shown at 82 and 84, particular arrangements of photocells 86 and 88 in registration with the code tracks, and suitable sources (not shown) of illumination for the code tracks. The manufacture of disk 80, the photocells of arrangements 86 and 88 and associated slits, and the sources of illumination all are analogous to their counterparts in FIGS. 1 and 2. The photocell arrangements are associated with output circuitry 89, which is identical to output circuitry 27 of FIG. 1.

Track 82 includes a pair of sub-tracks 90, 92 having ½ cycle out-of-phase increments that are equal in number. Track 84 includes a pair of sub-tracks 94, 96 having ½ cycle out-of-phase increments that are equal in number. The relationships between either of sub-tracks 90, 92 and either of sub-tracks 94, 96 is analagous to the relationships between tracks 12 and 14 of FIG. 1. Photocell arrangement 86 includes two pairs of photocells 98, 100 and 102, 104. Photocell arrangement 88 includes two pairs of photocells 106, 108 and 110, 112. The photocells of each pair, designated $PC_1$ and $PC_2$, are arranged in the push-pull arrangement illustrated in FIG. 5, with their polarities opposed. Since when one photocell of a pair is looking at a clear increment the other photocell of the pair is looking at an opaque increment, the output wave forms $i_1$ and $i_2$, as shown in FIG. 6, add to produce a composite wave-form I, the transition point of which is exactly determined.

By virtue of the foregoing structure, output circuitry 89 is capable of sensing transition points accurately irrespective of variations in the illumination source.

The present invention thus provides a novel direct reading disk encoder of unprecedented accuracy, versatility and efficacy. Since certain changes may be made in the foregoing invention without departing from the scope of the invention herein involved, it is intended that all matter contained in the foregoing description or shown in the accompanying drawings shall be interpreted in an illustrative and not in a limiting sense.

What is claimed is:

1. An encoding system comprising code means in the form of an array including first track means and second track means, sensing means in the form of an array including first photocell means and second photocell means, said code means and said sensing means being constrained for relative movement with said first track means and said first photocell means in registration and said second track means and said second photocell means in registration, illumination means for directing radiation to said track means, each of said track means having first regions and second regions for differently associating said radiation with said photocell means registered therewith, said first photocell means generating a first plurality of predeterminedly different signals representing relative positions of said code means and said sensing means, said second photocell means generating a second plurality of predeterminedly different signals representing relative positions of said code means and said sensing means, first logic means for representing said first plurality of predeterminedly different signals as a first plurality of digits, second logic means for representing said second plurality of predeterminedly different signals as a second plurality of digits, and carry-over means for controlling said second plurality of signals in response to said first plurality of signals, said logic means performing Exclusive-OR operations.

2. The encoding system of claim 1 wherein said first plurality of signals are out-of-phase waveforms and said second plurality of signals are out-of-phase waveforms.

3. The encoding system of claim 1 wherein said first track contains four times as many increments as said second track.

4. The encoding system of claim 1 wherein each of said plurality of photocell means are two in number.

5. The encoding system of claim 1 wherein said carry-over means includes switch means controlled by said first plurality of signals for feeding back portions of said second plurality of signals in order to increase and decrease their magnitudes.

6. The encoding system of claim 1 wherein each of said track means includes a plurality of sub-tracks, each of said plurality of sub-tracks including the same number of regions, each of said photocell means including a plurality of photocells in registration respectively with said plurality of sub-tracks, said plurality of photocells being operatively connected to each other.

7. A shaft angle encoding system comprising a code disk mounted for rotation on said shaft, said code disk presenting a plurality of adjacent tracks concentric about said shaft, a plurality of pairs of photocell means in respective registration with said plurality of tracks, each of said pairs of photocell means being spaced apart 90° in terms of a cycle of the track associated therewith, illumination means for directing radiation to said code disk, each of said tracks having first regions for directing radiation to said pair of photocell means in registration therewith and second regions for obscuring radiation from said pair of photocell means in registration therewith, said first regions and said second regions being alternate in sequence, an adjacent pair including one of said first regions and one of said second regions representing said cycle, each adjacent pair of said tracks including an outer track and an inner track, said pair of photocell means in registration with said outer track generating a first pair of 90° out-of-phase substantially sinusoidal signals, said pair of photocell means in registration with said inner track generating a second pair of 90° out-of-phase substantially sinusoidal signals, a first pair of amplifying means respectively for said first pair of substantially sinusoidal signals, a second pair of amplifying means for said second pair of substantially sinusoidal signals, a first pair of flip-flop means operatively connected to said first pair of amplifying means, a second pair of flip-flop means operatively connected to said second pair of amplifying means, a first exclusive-OR circuit operatively connected to said first pair of flip-flop means, a second exclusive-OR circuit operatively connected to said second pair of flip-flop means, and carry-over logic means including switch means operative in one condition for feeding back one signal from said first amplifier means to said second amplifier means and one signal from said second amplifier means to said first amplifier means and operative in another condition for feeding back another signal from said first amplifier means to said second amplifier means and another signal from said second amplifier means to said first amplifier means.

8. The encoding system of claim 7 wherein said outer track has four times as many increments as said inner track.

9. The encoding system of claim 7 wherein each of said tracks produces two digits.

10. The encoding system of claim 7 wherein a single amplifier is associated with a single digit.

11. The encoding system of claim 7 wherein each of said track means includes two sub-tracks, each of said sub-tracks including the same number of regions, said regions of one of said two sub-tracks being ½ cycle out-of-phase with said regions of the other of said two sub-tracks, each of said photocell means including two photocells in respective registration with said two sub-tracks, said two photocells being operatively connected in push-pull.

12. The encoding system of claim 7, wherein said outer track means has four times as many increments as said inner track means, each of said track means produces two digits, a single amplifier being associated with a single digit, each track means including two sub-tracks, each of said sub-tracks including the same number of regions, said regions of one of said two sub-tracks being ½ cycle out-of-phase with said regions of the other of said two sub-tracks, each of said photocell means including two photocells in respective registration with said two sub-tracks, said two photocells being operatively connected in push-pull.

References Cited by the Examiner

UNITED STATES PATENTS

| | | | |
|---|---|---|---|
| 2,877,356 | 3/1959 | Iddings | 250—233 X |
| 2,944,157 | 7/1960 | McAuslan et al. | 250—233 |
| 2,966,671 | 12/1960 | Abbott et al. | 250—219 |
| 3,096,444 | 7/1963 | Seward | 250—231 X |
| 3,233,845 | 12/1965 | Wales | 250—220 |

RALPH G. NILSON, *Primary Examiner.*

J. D. WALL, *Assistant Examiner.*